(12) United States Patent
Sesia et al.

(10) Patent No.: US 8,891,698 B2
(45) Date of Patent: Nov. 18, 2014

(54) FIRST SIGNIFICANT PATH DETECTION

(75) Inventors: Stefania Sesia, Nice (FR); Giuseppe Montalbano, Villeneuve Loubet (FR); Pierre Demaj, Nice (FR)

(73) Assignee: ST-Ericsson SA, Plan-les-Ouates (CH)

( * ) Notice: Subject to any disclaimer, the term of this patent is extended or adjusted under 35 U.S.C. 154(b) by 1272 days.

(21) Appl. No.: 12/326,762

(22) Filed: Dec. 2, 2008

(65) Prior Publication Data
US 2009/0180522 A1 Jul. 16, 2009

(30) Foreign Application Priority Data
Dec. 3, 2007 (EP) .................................... 07122144

(51) Int. Cl.
*H03D 1/04* (2006.01)
*H04B 1/7115* (2011.01)
*H04B 1/7117* (2011.01)

(52) U.S. Cl.
CPC ............ *H04B 1/7115* (2013.01); *H04B 1/7117* (2013.01)
USPC ............................. 375/346; 375/148; 375/316

(58) Field of Classification Search
USPC ........................... 375/148, 220, 260, 285, 346
See application file for complete search history.

(56) References Cited

U.S. PATENT DOCUMENTS

| 7,912,481 B2* | 3/2011 | Fujiwara et al. ............ 455/456.1 |
| 2001/0046221 A1 | 11/2001 | Ostman et al. |
| 2006/0013289 A1* | 1/2006 | Hwang ......................... 375/148 |
| 2007/0041431 A1* | 2/2007 | Reial ............................. 375/147 |
| 2007/0098051 A1* | 5/2007 | Shesha et al. ................. 375/148 |
| 2009/0103498 A1* | 4/2009 | Nilsson et al. ................ 370/336 |

FOREIGN PATENT DOCUMENTS

WO 2004/107597 A1 12/2004

* cited by examiner

*Primary Examiner* — Sam K Ahn
*Assistant Examiner* — Janice Tieu
(74) *Attorney, Agent, or Firm* — Leffler Intellectual Property Law, PLLC

(57) ABSTRACT

A scheme determines the first significant path (FSP) of a received multipath signal, from data defining the relative delay and the amplitude of the individual signal paths occurring in a series of time frames. The scheme includes filtering the data to spread the signal paths, performing a persistence test between frames to reject spurious signal paths, combining the energy of the signal paths in a frame, applying a test to determine the time at which the combined energy satisfies a criterion, and selecting the FSP dependent on that time. The combined energy may be evaluated within a sliding window, and the position of the window within the frame determined that maximizes the combined energy. Alternatively, the combined energy may be evaluated as the cumulative energy through the frame, and the position determined at which the cumulative energy reaches a threshold.

28 Claims, 6 Drawing Sheets

FIRST SIGNIFICANT PATH DETECTION

REFERENCE TO RELATED FOREIGN APPLICATION

This application claims the benefit under 35 U.S.C. §119 (a) of European Patent Application No. EP07122144.4, which is incorporated herein by reference in its entirety.

BACKGROUND

1. Technical Field

This disclosure relates to a method and apparatus for processing a received multipath signal, in particular for determining the earliest significant signal path. The method and apparatus have application in, for example but not exclusively, the Universal Mobile Telecommunication System (UMTS) and in particular the High Speed Downlink Packet Access (HSDPA) service of UMTS.

2. Description of the Related Art

The HSDPA scheme has been introduced in Release-5 of the UMTS standard to provide a high data rate service. For previous releases of the UMTS standard, such as Release-99, a suitable receiver architecture is considered to be the well known Rake receiver. For HSDPA, because of the high data rate and due to the dispersive nature of the channel, a Rake receiver is considered less suitable and a receiver employing an equalizer is considered preferable. The equalizer needs information about the earliest significant signal path, referred to in the present specification and claims as the first significant path (FSP), of a received multipath signal. This is in contrast to a Rake receiver which employs the timing of all the paths. The present disclosure addresses the provision of information about the FSP.

In the UMTS Frequency Division Duplex (FDD) downlink and in other similar systems, although the signals transmitted from a base station (BS) to different mobile stations are orthogonal, this orthogonality no longer exists at the mobile station (MS) receiver due to the multipath effect of the propagation channel between the transmitter and the receiver. This loss of orthogonality causes inter-code interference, inter-chip interference and inter-symbol interference in the symbol estimates. Receivers that are within the optimal or close-to-optimal category, such as multiuser detectors (MUDs) and interference cancellers (ICs), most of the time require knowledge about the signal and the channel parameters of all active users so as to mitigate the multipath effect and detect the desired data stream reliably. However the possibility of implementing MUDs or ICs in mobile stations is limited due to their high complexity and due to the fact that the transmission parameters of all the users are usually not known. A very practical and highly utilized suboptimal solution is the conventional Rake receiver that performs a matched filter operation on the code of the desired user, such that multi-user interference is considered as an additional white noise. However, when small spreading factors are used to achieve high data rates, as for example for HSDPA, the performance of the Rake receiver decreases due to the fact that the multipath interference becomes significant and the correlation characteristics of the spreading sequences are destroyed. For these reasons, the use of equalizers is considered for the HSDPA scheme in order to restore the orthogonality between the users and limit the interference, allowing a higher data rate to be achieved. For HSPDA a suitable equalizer is a variant of the Normalized Least Means Squares (NLMS) equalizer, implemented as an adaptive finite impulse response (FIR) filter and which requires the FSP to be placed near the center of the equalizer window. If HSPDA is implemented on a co-processor, the location of the FSP may be signalled to the HSDPA co-processor by the host on which it resides, and the location may be periodically updated.

BRIEF SUMMARY

One embodiment provides a way of determining the FSP of a received multipath signal.

According to one embodiment there is provided method of processing a received multipath signal comprising a plurality of signal paths to determine the earliest significant signal path, the method comprising:

providing for each of a series of time periods data representative of the energy and relative delay of the signal paths;

filtering the data for each time period to spread the data of each signal path;

identifying from the filtered data a signal path which, after the spreading, is present at the same delay in a plurality of the time periods, and identifying any further such signal paths;

determining an indication of the combined energy of the filtered data of the identified signal paths within a time period;

determining a time at which the indication satisfies a predetermined criterion;

selecting the earliest significant signal path dependent on the determined time.

Therefore, commencing in the providing step with data about the energy and timing of a signal received via a plurality of paths, the data may in the filtering step be filtered to spread the energy of the signal paths in time. Then in the identifying step a persistence test can be performed to identify signal paths which are present in a plurality of time periods, thereby enabling noise and spurious signals to be ignored. In the first determining step the energy of the identified signal paths can be combined and in the second determining step a test applied to the combined energy in order to determine the time of the FSP. In this way, the method provides an efficient and robust algorithm for determining the FSP.

According to one embodiment there is provided an apparatus for processing a received multipath signal comprising a plurality of signal paths to determine the earliest significant signal path, the apparatus comprising:

data input means for providing for each of a series of time periods data representative of the energy and relative delay of the signal paths;

data filtering means coupled to the data input means and adapted to filter the data for each time period to spread the data of each signal path;

signal path identification means coupled to the data filtering means and adapted to identify from the filtered data a signal path which, after the spreading, is present at the same delay in a plurality of the time periods, and to identify any further such signal paths;

energy determination means coupled to the signal path identification means and adapted to determine an indication of the combined energy of the filtered data of the identified signal paths within a time period;

energy assessment means coupled to the energy determination means and adapted to determine a time at which the indication satisfies a predetermined criterion; and signal path selection means coupled to the criterion assessment means and adapted to select the earliest significant signal path dependent on the determined time.

Thus the disclosure also extends to apparatus for carrying out a method according to one embodiment. This might comprise a processor, digital signal processor (DSP), central processing unit (CPU) or such like. Additionally or alternatively, it might comprise a hard-wired circuit or circuits, such as an application-specific integrated circuit (ASIC), or embedded software. The disclosure also extends to a mobile station comprising the apparatus, and to a mobile communication system comprising a transmitter for transmitting signals and a mobile station comprising the apparatus for processing the transmitted signals when received as multipath signals.

According to one embodiment, there is provided computer software or computer program code adapted to carry out the method described above when processed by a processing means.

According to one embodiment there is provided a computer readable medium comprising a computer program adapted to perform the method described above. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the method described above.

Optionally the data representative of energy may be normalized prior to the filtering. This can reduce the effect of variations in receiver gain in the different time periods, such as may be caused by automatic gain control (AGC) circuitry.

Optionally the data may be sampled data derived at sample intervals, and the filtering may spread the data for each signal path over a range of one of 3, 4 or 5 sample intervals. Such a range of values enables noise and spurious signals to be differentiated reliably from valid signals.

Optionally the filtering may be performed with a symmetric finite impulse response (FIR) filter, for example having three taps. Such a filter is simple to implement and can provide a better performance than a non-symmetric filter.

Optionally the plurality of time periods comprises one of 2, 3, or 4 time periods. Such a range of values enables noise and spurious signals to be differentiated reliably.

Optionally the first determining step comprises determining the indication of combined energy within successive positions of a sliding window of duration shorter than the time period. Such an indication is simple to determine and yet enables a good performance to be achieved under practical channel conditions. In this case the predetermined criterion may comprise maximization of the combined energy within the sliding window, and in the selecting step may include selecting the earliest significant signal path dependent on the determined time may comprise selecting the signal path which has its peak data value at the delay where the combined energy within the sliding window is maximized. Where the data is sampled data derived at sample intervals, the length of the window may be 8 sample intervals.

Optionally in the first determining step the indication of combined energy comprises an indication of cumulative energy through the time period. The indication of cumulative energy may be a cumulative density function. Such a scheme is simple to implement and enables a good performance to be achieved under practical channel conditions. In this scheme, the predetermined criterion may comprise reaching a threshold value, and in the selecting step may include selecting the earliest significant signal path may comprise selecting the earliest signal path that has its peak data value at or after the determined time.

Optionally, the relative delay of the selected earliest significant signal path may be employed in an equalizer for further processing the received multipath signal, thereby enabling effective channel estimation by alignment of the FSP with the equalizer window. It may also be employed for generating data representative of the energy and relative delay of received signal paths, thereby enabling performance to be progressively improved by iteration of the method.

Optionally, where the indication of combined energy comprises an indication of cumulative energy through the time period, the relative delay of the selected earliest significant signal path may be adjusted by a bias value dependent on the delay spread of the signal paths, before being employed in an equalizer. This enables the energy in the equalizer window to be increased in cases where the extent of delay spread would otherwise cause signal paths to fall outside of the equalizer window. In this case an indication of the delay spread of the signal paths may be determined as an indication of the time between the occurrences of two values of the cumulative energy.

Optionally the relative delay of the selected earliest significant signal path may be employed only if that delay differs from a previously determined relative delay of a previously selected earliest significant signal path by more than a predetermined hysteresis value, otherwise the previously determined relative delay may be employed. This provides hysteresis which can reduce the effect of jitter in the time of receipt of the selected earliest significant signal path.

Optionally the relative delay of the selected earliest significant signal path may be employed only if that delay differs from a previously determined relative delay of a previously selected earliest significant signal path by less than a predetermined slew value, otherwise the previously determined relative delay may be employed adjusted by the predetermined slew value. This in effect limits the maximum change in delay employed to the predetermined slew value, which can prevent the undesirable effect of larger time changes.

Corresponding optional features apply also to the apparatus.

BRIEF DESCRIPTION OF THE SEVERAL VIEWS OF THE DRAWINGS

Embodiments will now be described, by way of example only, with reference to the accompanying drawings wherein.

DETAILED DESCRIPTION

Figure 1:
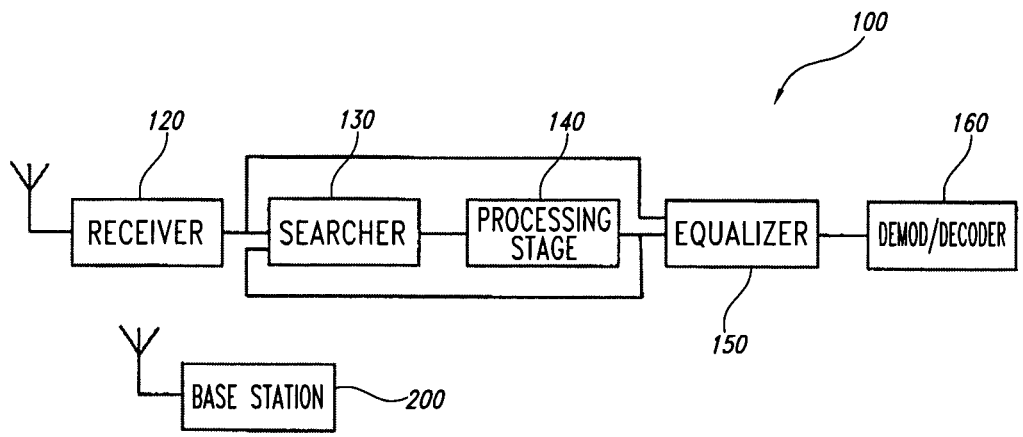
FIG. 1 is a block schematic diagram of relevant portions of a UMTS system.

Referring to FIG. 1, there is illustrated a block schematic diagram of a UMTS mobile communication system comprising a base station 200 and a mobile station 100. Only the elements of the mobile station 100 relevant to the understanding of the present disclosure are illustrated. The mobile station 100 comprises a receiver 120 coupled to an antenna for receiving a signal from the base station 200. This signal is a multipath signal (e.g., a multipath Code Division Multiple Access—CDMA—signal), comprising a plurality of signal components each received via a different signal path due to reflections. The receiver 120 is adapted to receive radio frequency signals, convert the radio frequency signals to baseband or to a low intermediate frequency, and to apply channel filtering to reject unwanted signals occurring at other frequencies. The resulting signal is delivered on an output of the receiver 120 which is coupled to an input of a searcher 130 which processes the signal to provide in each of a series of time periods data representative of the energy and relative delay of the signal components received by different paths. (In this specification and claims the terms "signal component" and, more frequently, "signal path" are is used to mean a signal received via a particular path). Because the energy of a signal component is related to the amplitude of the signal component, data representative of energy is also representative of amplitude. This data is provided at an output of the searcher 130 which is coupled to an input of a processing stage 140 which determines the time of the FSP as described below. The time of the FSP is provided at an output of the processing stage 140 which is coupled to an input of an equalizer 150. The equalizer 150 is also coupled to an output of the receiver 120, and the equalizer 150 employs the indicated time of the FSP to perform equalization of the signal delivered by the receiver 120. An output of the equalizer 150 is coupled to further stages 160 of the mobile station 100 for demodulating and decoding the signal, the details of which will not be described as they are not pertinent to the understanding of the present disclosure. The output of the processing stage 140 is also optionally coupled to an input of the searcher 130 in which case the time of the FSP indicated by the processing stage 140 can be employed by the searcher 130 to provide a timing reference for subsequent determinations of the FSP.

Figure 2:
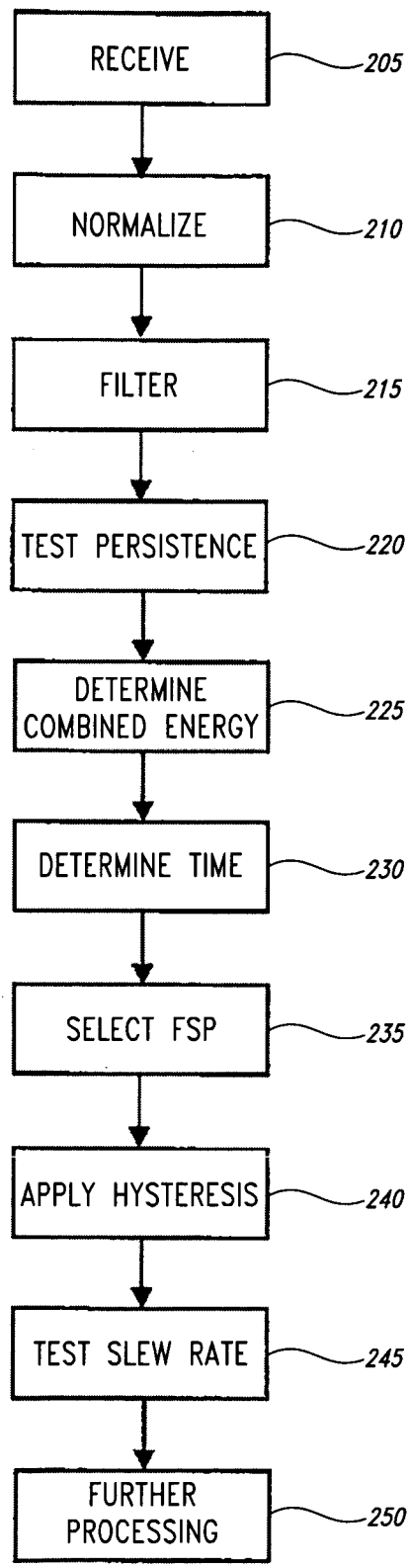
FIG. 2 is a flow chart illustrating the method in accordance with an embodiment.

FIG. 2 illustrates a method of processing a received multipath signal as implemented by the processing stage 140. The method commences at step 205 with receiving for each of a series of time periods, data representative of the energy and relative delay of signal components received by different paths. This corresponds to the data provided at the output of the searcher 130 in FIG. 1. For UMTS HSDPA, each time period may correspond to a frame which has a duration of 10 ms. The data may be sampled data corresponding to a sample rate of twice the UMTS chip rate of 3.84 Mchip.$^{s-1}$.

At step 210 the data is optionally normalized, which can reduce the effect of variations in receiver gain in the different time periods, such as may be caused by automatic gain control (AGC) circuitry in the receiver 120.

At step 215 the data for each time period is filtered to spread in time the data corresponding to each signal path. The filtering may be performed by a symmetric FIR filter. For UMTS HSDPA, a suitable symmetric FIR filter would have three taps, thereby spreading the data over three sample periods. Suitable tap coefficients for such a filter are $\alpha_1$, $\alpha_0$, $\alpha_1$, where $\alpha_1=0.3469$ and $\alpha_0=0.8714$.

At step 220 a persistence test is performed by identifying from the filtered data a signal path which appears at the same relative delay in a plurality of the time periods, and identifying any further such signal paths. The plurality of time periods may preferably comprise one of 2, 3, or 4 time periods.

At step 225 an indication of the combined energy of the filtered data of the identified signal paths is determined.

At step 230 a time at which the indication from step 225 satisfies a predetermined criterion is determined, and at step 235 the FSP is selected dependent on the determined time.

In one preferred embodiment, the combined energy determined at step 225 may be calculated within successive positions of a sliding window having a duration less than the time period, and the predetermined criterion applied in step 230 may comprise maximization of the combined energy within the sliding window. In this case the signal path which has its peak data value at the delay where the combined energy within the sliding window is maximized may be selected at step 235 as the FSP. Such a sliding window may preferably have a length of 8 or 16 sample intervals.

In another preferred embodiment, the combined energy determined at step 225 may be calculated as the cumulative energy through the time period, and for example may be a cumulative density function (CDF). In this case the predetermined criterion applied in step 230 may comprise reaching a threshold value, such as 10%, and selecting the FSP at step 235 may comprise selecting the earliest signal path that has its peak value at or after the determined time.

At step 240 hysteresis is optionally applied by using the relative time of the selected FSP only if that time differs from a previously determined relative time of a previously selected FSP by more than a predetermined hysteresis value, and otherwise using the previously determined relative time of receipt. In this way small, frequent changes in time of the FSP can be ignored, thereby reducing jitter.

At step 245 a slew rate test is optionally applied by using the relative time of receipt of the selected FSP only if that time differs from a previously determined relative time of receipt of a previously selected FSP by less than a predetermined slew value, and otherwise employing the previously determined relative time of receipt adjusted by the predetermined slew value. In this way, in effect, the maximum change in time of the FSP can be limited.

At step 250 the relative time of receipt of the selected FSP, optionally modified according to steps 240 and 245, is employed for further processing. Preferably such time is employed by the equalizer 150 for further processing the received multipath signal; for example the FSP may be aligned around the center of the equalizer window, which for UMTS may have a width of 15 chip periods (30 sample periods for two times oversampling). Optionally such time is employed for generating data representative of the energy and relative delay of signal paths. As such, the time may be employed by the searcher 130 for generating the data of step 205 for a subsequent iteration of the method steps 210 to 250.

At step 250, prior to employing the relative time of receipt of the selected FSP for further processing by the equalizer 150, in the case where cumulative energy was calculated at step 225, the time may be adjusted by a bias value dependent on the delay spread of the signal path. An indication of the delay spread may be determined as an indication of the time between the occurrence of two values of the cumulative energy. For example the width of the CDF between 10% and 90%, or other values, may be used as indicative of the spread of the channel. In one embodiment, if the width of the CDF is less than 8 chip periods, then the time of receipt of the FSP may remain unadjusted; if the width of the CDF is in the range 8 to 10 chip periods, then the time of receipt of the FSP may be adjusted by a bias value of 2 chip periods to place the FSP earlier in the equalizer window; if the width of the CDF is greater than 10 chip periods, it can be best to place the FSP in the center of the equalizer window.

Figure 3:
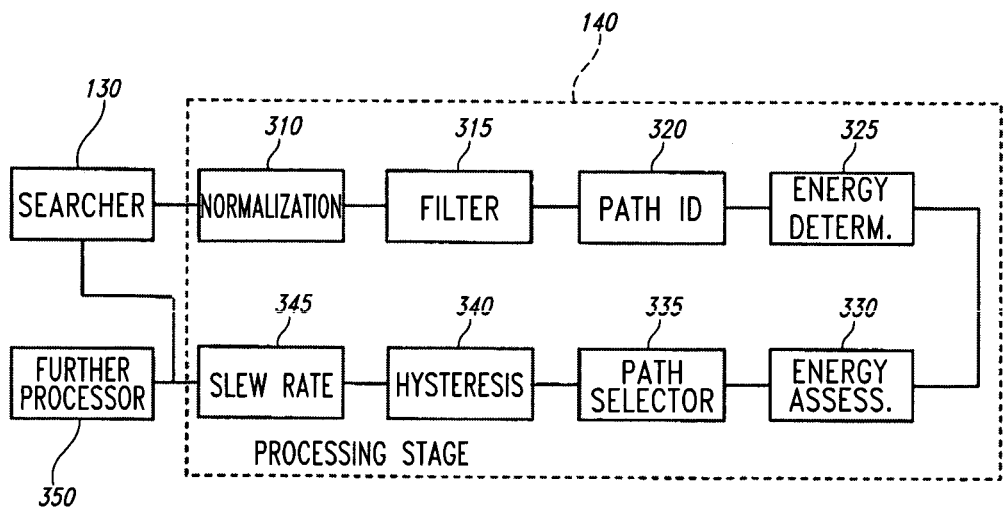
FIG. 3 is a block schematic diagram of an apparatus for implementing the method of FIG. 2.

FIG. 3 is a block schematic diagram of an apparatus for implementing the method of FIG. 2. Searcher 130 is adapted to provide the data in accordance with step 205 and is identical to the searcher 130 illustrated in FIG. 1. Stages 310 to 345 in FIG. 3 correspond to the processing stage 140 in FIG.

1. A normalization stage 310 is coupled to an output of the searcher 130 and is adapted to perform optional normalization of the data in accordance with step 210. A filter 315 is coupled to an output of the normalization stage 310 and is adapted to filter the data in accordance with step 215. A signal path identification stage 320 is coupled to an output of the filter 315 and is adapted to perform a persistence test in accordance with step 220. An energy determination stage 325 is coupled to an output of the signal path identification stage 320 and is adapted to determine an indication of energy in accordance with step 225. An energy assessment stage 330 is coupled to an output of the energy determination stage 325 and is adapted to apply the predetermined criterion in accordance with step 230. A signal path selection stage 335 is coupled to an output of the energy assessment stage 330 and is adapted to select the FSP in accordance with step 235. A hysteresis stage 340 is coupled to an output of the signal path selection stage 335 and is adapted to apply optional hysteresis in accordance with step 240. A slew rate stage 345 is coupled to an output of the hysteresis stage 340 and is adapted to perform the optional slew rate test in accordance with step 245. Further processing stage 350 is coupled to an output of the slew rate stage 345 and is adapted to perform further processing in accordance with step 250. For example, the further processing stage 350 may comprise the equalizer 150 illustrated in FIG. 1. For employing the results of the slew rate stage 345 in the searcher 130 as described above, an output of the slew rate stage 345 may optionally be coupled to an input of the searcher 130.

Aspects of the apparatus of FIGS. 1 and 3 and the method of FIG. 2 will now be described in more detail for embodiments suitable for use with UMTS HSDPA.

For UMTS HSDPA, the signal transmitted by the base station 200 and processed by the mobile station 100 as described below may be a Common Pilot Channel (CPICH). For a UMTS mobile station 100, each time period may be a frame, which has a duration of 10 ms. Each frame comprises 15 slots each comprising 10 symbols, and each symbol comprises 256 chips, with each chip having a duration 0.26 µs. Therefore each frame comprises 38400 chips, and if the receiver 120 employs an oversampling rate of 2, with each sample corresponding to a half-chip, each frame corresponds to 76800 samples. The sample interval is 0.13 µs.

Initial Data

The data provided at step 205 may be provided as a first vector of dimension 16 containing the data values, 'pathValues', of up to 16 signal paths, and a second vector of dimension 16 containing the timing, 'pathDelay', of the signal paths relative to an absolute timing reference. The data should also include an indication of the absolute timing reference, and may indicate a threshold, 'Thold', which is indicative of the noise level in the receiver 120 and the gain of the receiver 120.

The absolute timing reference is the reference used to set the offset of a locally generated scrambling code which is correlated with the received signal in order to detect the CPICH. The absolute timing reference has a value in the range 0 to 76800 samples, for a sample rate of twice the chip rate. At the beginning the absolute timing reference is set according to the output of the UMTS Primary Synchronization Channel (PSCH) procedure and Synchronization Channel (SCH) procedure. The PSCH and SCH procedures give a coarse estimation of the position of the peak of the first signal path. Subsequently, the absolute timing reference may be updated for the next frame according to the outcome of the FSP detected as described herein, and as represented by the coupling in FIGS. 1 and 3 of the output of the further processing stage 140 to an input of the searcher 130. The absolute timing reference is an important limitation for the path tracking since the path detection algorithm conventionally used by the searcher 130 can only detect paths that are in the range −8 to +151 samples relative to the absolute reference, i.e. the second vector of dimension 16 containing the timing of the paths, 'pathDelay', will contain values in the range −8 to +151. Therefore, when the absolute timing reference is updated for the next frame according to the outcome of the FSP, it should be offset by −72 samples compared with the computed FSP in order to place the computed FSP in center of the path detection range.

The absolute timing reference abs_ref for frame n may be expressed mathematically in sample periods as $$\text{abs\_ref}[n] = \text{abs\_ref}[n-1] + \text{FSP}[n-1] - 72$$

where FSP[n−1] is the pathDelay of the FSP selected for frame n−1.

Normalization

The normalization at step 210 may be performed by dividing the input vector 'pathValues' by the threshold Thold in order to have a measure of the SNR independent of the AGC gain. Expressed mathematically, if $$\text{path\_Values}[i] = (P+N)G_{AGC}$$

where P is the measured power of signal path i, N is the noise power for the current frame, and $G_{AGC}$ is the gain of the receiver 120 for the current frame, and if $$\text{Thold} = \hat{N} G_{AGC}$$

where N is the average noise power, the normalized values are $$\frac{\text{path\_Values}[i]}{\text{Thold}} \approx \frac{P}{N} + 1 \approx SNR + 1$$

where SNR is the signal to noise ratio P/N. Thus normalization provides signal to noise values which are independent of gain.

For the convenience of subsequent processing, the pathValues information provided in the first vector and the pathDelay information provided in the second vector may be combined by mapping the pathValues to a vector of 160 values where each path is located in the vector according to its respective pathDelay.

Filtering

As stated above, the filtering of step 215 may be performed with a three tap symmetric FIR filter having coefficients $\alpha_1$, $\alpha_0$, $\alpha_1$, where $\alpha_1 = 11367$ (0.3469 in floating point) and $\alpha_0 = 28554$ (0.8714 in floating point). Other numbers of taps may be used, for example 4 or 5.

Persistence Test

An example of the persistence test of step 220 is as follows. The data provided by the searcher 130 resulting from the measurements made in one frame is stored for a number of subsequent frame periods, for example 2, 3, 4, or 5 frame periods. For each path detected within a frame, a test is made to determine, after the application of the filtering, whether the path occurs in the same relative time within the stored previous frames. If such re-occurrence is found, the path is considered persistent and the average value of that path within the frames is stored in a vector path_detected [k] where k is the current position, otherwise the value of the path is not stored.

Figure 4:
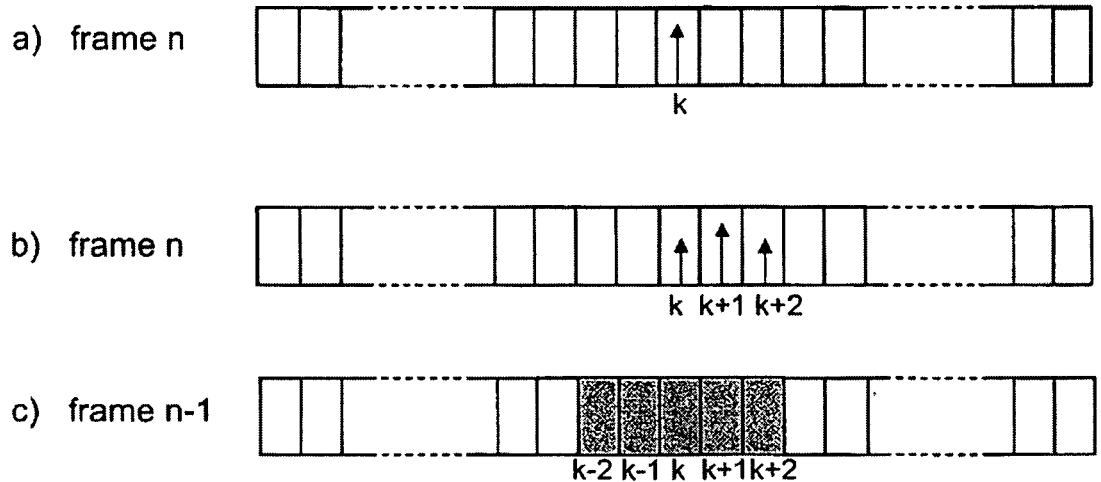
FIG. 4 illustrates the persistence test.

The use of the filtering at step 215 enables the persistence test to be simple and not require the use of masks. The persistence test is performed over the same range of samples as the filter spreads the energy, as illustrated by the following example with reference to FIG. 4. In FIG. 4, diagrams a), b) and c) each represent a frame subdivided into sample periods, with a) and b) representing the $n^{th}$ frame and c) representing the $(n-1)^{th}$ frame. Diagram a) illustrates that the searcher 130 has detected the peak of a signal path in the $k^{th}$ sample period of the nth frame. Diagram b) illustrates the effect of filtering in a three-tap FIR filter, whereby the energy of the peak is spread over sample periods k, k+1 and k+2. If the persistence test is performed over two frames, persistence will be detected if a peak is detected in the corresponding positions k, k+1 and k+2 of the preceding frame. Due to spreading by the filter 315, this will occur if the searcher 130 has detected a peak in any one of the positions k−2, k−1, k, k+1 and k+2 of the preceding frame. Diagram c) of FIG. 4 illustrates these five positions in which a signal path peak in the $(n-1)^{th}$ frame prior to filtering will result in the signal path in the $k^{th}$ sample period of the $n^{th}$ frame, prior to filtering, being considered persistent.

If the probability of the searcher 130 detecting a false peak, for example due to noise or interference, is $p_n$, the probability of detecting a false peak after the persistence test is equal to the probability that the searcher 130 detects a false peak in one of the five positions around the false peak detected in the previous frame. Hence the probability of locking to a false peak after the persistence test is $5p_n^2$, which demonstrates that for typical values of $p_n$ the persistence test can reduce the likelihood of detecting false signal paths.

Energy Determination and FSP Assessment

The combined energy of filtered data of the signal paths that satisfy the persistence test may be determined by calculating the energy of these signal paths. Two different ways are described below for calculating and assessing the combined energy.

In the first way, the combined energy is calculated within a sliding window which has a duration shorter than a frame, and may be shorter than the span of the window used by the equalizer 150 which subsequently employs the FSP. The channel estimation is used in order to train the equalizer 150. In particular the estimated channel impulse response is time reversed and copied into the first half of the equalizer window where the FSP is put into the mid-position.

For example, if the equalizer window spans 30 samples, the FSP being in position 16), the combined energy may be calculated within a sliding window of duration 16 samples. In this example a sliding window of 16 samples is selected because, when the FSP is placed in the center of the CHEST window, signal paths occurring later than 16 samples after the FSP lie outside of the CHEST window and therefore do not contribute to the operation of the equalizer. The combined energy may be expressed mathematically as $$E\_FSP[i] = \sum_{m=0}^{15} \text{path\_detected}[i+m]$$

where i indexes the sample position of the window within a frame, and m indexes the position within the sliding window. The position FSP_pos of the FSP within the frame is selected as the value of the index i for which E_FSP[i] is maximized.

Figure 5:
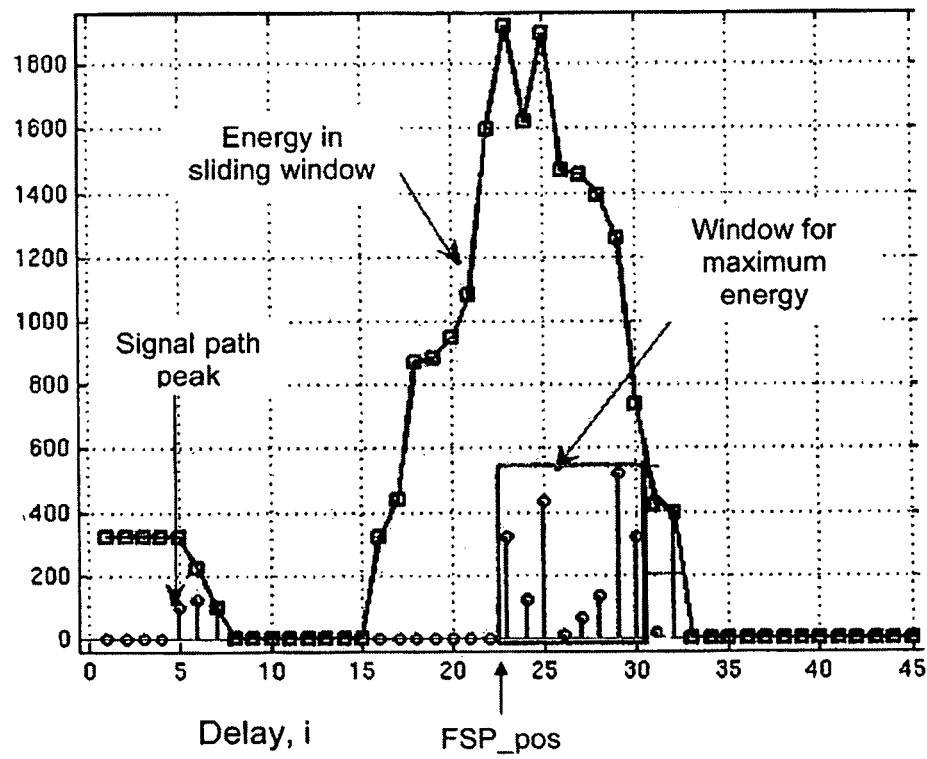
FIG. 5 illustrates a first scheme for determining FSP position.

FIG. 5 shows an example of determining the FSP position in this way. The circled points represent peak values of individual signal paths after the filtering. The points indicated by squares represent the combined energy E_FSP[i] within a sliding window spanning 16 samples. The position of the window which maximizes E_FSP[i] is indicated, and also the position FSP_pos.

Figure 6:
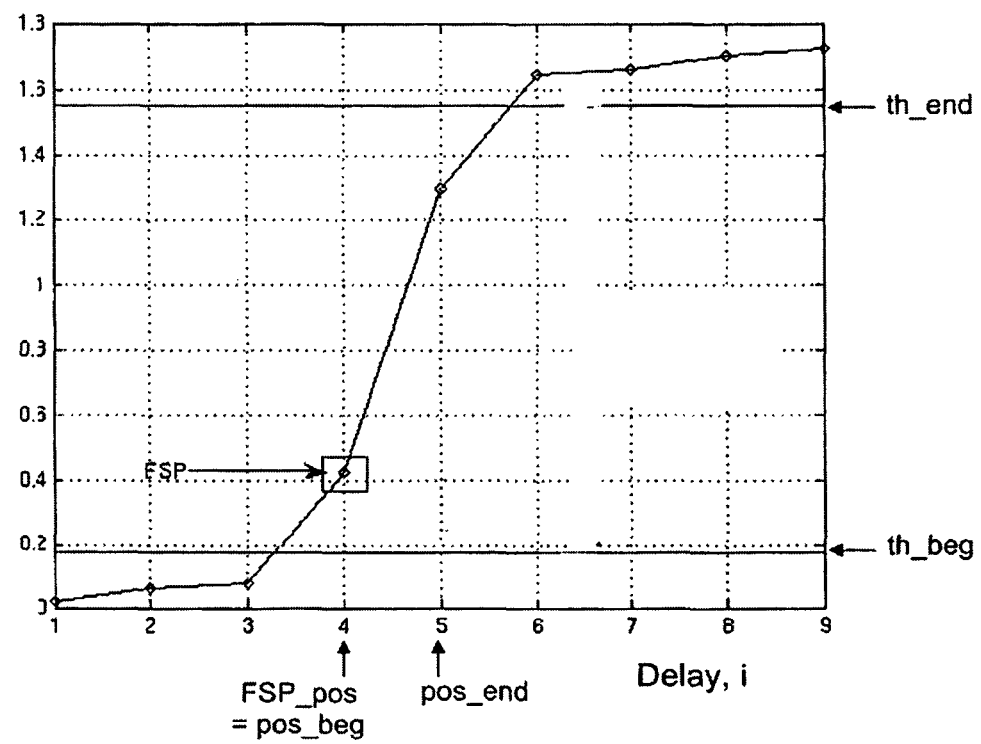
FIG. 6 illustrates a second scheme for determining FSP position.

In the second way, the combined energy is calculated as the cumulative energy over the whole duration of the frame, and FSP_pos is determined as the first position within the frame for which the cumulative energy exceeds a threshold. This is illustrated in FIG. 6, where the threshold is set at a value of 0.175 and FSP_pos is considered to occur at a delay of 4 samples.

In an enhancement of this second way of calculating the combined energy and determining the position of the FSP, the delay spread of the channel is taken into account. This can be advantageous in situations where the channel delay spread is so large that simply placing the FSP in the center of the CHEST window results in a large portion of energy lying outside of the CHEST window. This happens, for example, in scenarios where there are two principle signal paths spaced by more than 7 chips (14 samples) and the CHEST window is 30 samples wide. In this case FSP_pos may be biased to increase the energy within the CHEST window.

The spread of the channel is estimated as the delay difference between the positions within the frame at which the calculated cumulative energy of the energy of the signal paths within the frame exceeds an initial threshold (th_beg in FIG. 6) at time pos_beg and a final threshold (th_end in FIG. 6) at time pos_end. The spread can be expressed mathematically in chip periods as $$\text{spread} = \frac{\text{pos\_beg} - \text{pos\_end} + 1}{\text{oversampling\_rate}}.$$

Most of the energy is detected between these thresholds. If the spread of the channel is between 8 and 10 chips is a positive bias applied to ensure 100% of the energy of the signal paths of the frame lies within the CHEST window. The application of the bias is restricted to the case of a spread of 8 to 10 chips because some of the energy of the FSP can be lost if a squelching mask is used and if FSP_pos is set in the last position before the squelch mask. Note that the ideal position for the FSP in the window of the equalizer 150 is the position 16, i.e. 8 chips with the oversampling equal to 2. The algorithm is as follows. If the spread of the channel is higher than 10 chips, spread >10, then no bias is applied because a large bias would be required which would shift the FSP away from the center of the CHEST window thereby degrading the channel estimation, but instead it is better to place the FSP in the central position 16. If the spread of the channel is between 8 and 10 chips, then a bias of q=2 samples is applied to FSP_pos to increase the energy in the CHEST window. If the spread is less than 8, no bias is applied because sufficient energy lies within the CHEST window.

Figure 7:
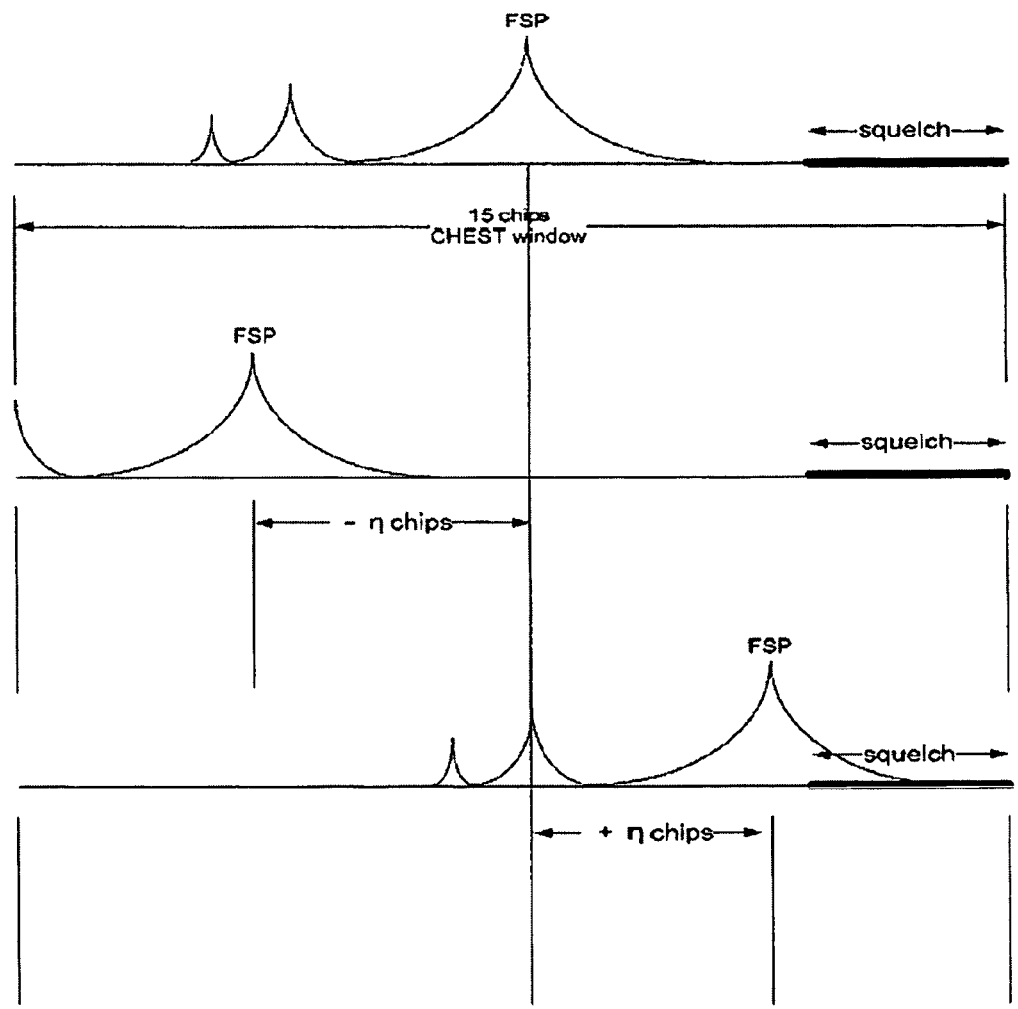
FIG. 7 illustrates biasing the FSP position within an equalizer window.

FIG. 7 shows the CHEST window and an FSP with two smaller signal paths. The top diagram illustrates the ideal position of the FSP in the center of the CHEST window and the squelch mask at the end. The middle diagram illustrates the FSP after a positive bias has been applied, and the lower diagram illustrates the FSP after a negative bias has been applied.

In the case delay is equal to −160 this means that the spreading of the channel has been discovered to be too high, which is typical of a noise-only situation, and in this case the algorithm does not the apply a bias to the value of FSP_pos.

One advantage of employing this second way (i.e. employing the cumulative energy) is that energy falling within the side lobes of the root raised cosine (RRC) filter typically used in the searcher 130 need not have a significant impact on the FSP selection. The searcher 130, especially in case of low noise power, detects the main peak and a peak corresponding to the side lobes of the RRC filter. The side lobes are around −13 dB with respect to the main peak. If the FSP is selected where the cumulative energy is higher than, say, 10% of the total energy in the frame, the side lobe energy is an insignificant part of that energy and in effect is not detected.

Hysteresis

The hysteresis of step 240 may be applied as follows in order to limit the impact of jitter in reporting the FSP location. If the difference between FSP_pos calculated for time frame n−1 (FSP_pos[n−1]) and FSP_pos calculated for time frame n (FSP_pos[n]) is smaller than a predetermined hysteresis value, then the FSP_pos for time frame n is set equal to FSP_pos for time frame n−1, i.e. FSP_pos[n]=FSP_pos[n−1].

Slew Rate

The slew rate test of step 245 may be applied as follows to prevent large changes in FSP_pos. If the magnitude of the difference between FSP_pos[n] and FSP_pos[n−1] is larger than a predetermined slew value, then the difference is saturated to the predetermined slew value, i.e. FSP_pos[n] is set equal to FSP_pos[n−1] plus or minus the predetermined slew value, according to whether the difference is positive or negative.

Finally some information is provided below that can assist a skilled person in selecting values for the various parameters of the present disclosure.

Constant Error Bias

A constant bias of +/−1 chip from the true FSP location can be tolerated with a performance loss of less than 0.2 dB. It has been found that the performance with an error bias of +1 and +2 chips in certain cases is better than the performance with no error at all. Placing the FSP in the center of the CHEST window is an approximation of the best placement. It has been found that the best placement is such that the constrained MMSE (minimum means square error) solution to the channel estimation is the one with the largest FSP energy in the CHEST window. Due to the squelching mask in the channel estimation process, a positive error has a different effect than a negative error. In particular an error of +3 chips is worse than an error of −3 chips. As the advantage of the squelching mask is uncertain, it is preferable to not use a squelching mask.

Jitter

A Gaussian jitter with a standard deviation of up to 0.9 chips with an update rate equal to 10 frames can be tolerated, providing a performance loss with respect to ideal FSP reporting of less than 0.2 dB. The loss will be smaller if the update period is longer or if the errors are correlated. A standard deviation of 0.9 in the chip jitter implies that the reported FSP is within +/−1 chip approximately 92% of the time when quantized to half a chip period.

Update Rate

The FSP update rate should be faster than 10 frames to ensure the throughput degradation is less than 0.5 dB. When there are no FSP estimation errors the throughput performance degrades monotonically with increasing update period. Thus for the case of a standard deviation of zero, the lower the update period, the better the tracking of the true FSP, and thus the better the throughput performance. When there are FSP estimation errors, i.e. the standard deviation is greater than zero, the performance for various update periods does not vary monotonically. In other words, there exists an update period which gives optimum performance in the presence of FSP estimation errors. The reason for such behavior is as follows.

At very low update periods (very high update frequency), though the true FSP can be tracked efficiently, consecutive FSP updates have a lot of jitter and thus the equalizer has to re-converge after most FSP updates. The re-convergence penalty associated with very frequent updates causes the throughput performance to drop.

At very high update periods (very low update frequency), although the re-convergence loss of the equalizer due to jitter in the reported FSP is negligible, the tracking of the true FSP is not at all efficient and the delay in the reported FSP due to the high update period can cause significant degradation in performance. There exists a trade-off between re-convergence loss due to low update periods and delay in FSP reporting at high update periods. Simulation results suggest that an update period of 5 frames provides good results.

From reading the present disclosure, other variations and modifications will be apparent to the skilled person. Such variations and modifications may involve equivalent and other features which are already known in the art of signal receivers and which may be used instead of, or in addition to, features already described herein.

Although the appended claims are directed to particular combinations of features, it should be understood that the scope of the present disclosure also includes any novel feature or any novel combination of features disclosed herein either explicitly or implicitly or any generalization thereof, whether or not it relates to the same embodiment as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and reference signs in the claims shall not be construed as limiting the scope of the claims.

The invention claimed is:

1. An apparatus, comprising:
processing means for processing a received multipath signal having a plurality of signal paths to determine the earliest significant signal path, the processing means including:
data input means for providing, for each of a series of time periods, data representative of the energy and relative delay of the signal paths;
data filtering means, coupled to the data input means, for filtering the data for each time period to spread the data of each signal path;
signal path identification means, coupled to the data filtering means, for identifying from the filtered data a signal path which, after the spreading, is present at the same delay in a plurality of the time periods, and to identify any further such signal paths;
energy determination means, coupled to the signal path identification means, for determining an indication of combined energy of the filtered data of the identified signal paths within a time period;

energy assessment means, coupled to the energy determination means, for determining a time at which the indication satisfies a selected criterion; and path selection means, coupled to the energy assessment means, for selecting the earliest significant signal path dependent on the determined time.

2. An apparatus as claimed in claim 1, comprising normalization means, coupled to the data input means, for normalizing the data representative of energy prior to the filtering, to reduce the effect of variations in receiver gain in the different time periods.

3. An apparatus as claimed in claim 1, wherein the data is sampled data derived at sample intervals, and wherein the data filtering means is for spreading each signal path over a range of one of 3, 4 or 5 sample intervals.

4. An apparatus as claimed in claim 1, wherein the data filtering means comprises a symmetric finite impulse response filter.

5. An apparatus as claimed in claim 1, wherein the plurality of time periods employed by the signal path identification means comprises one of 2, 3 or 4 time periods.

6. An apparatus as claimed in claim 1, wherein the energy determination means include means for determining the indication of combined energy within successive positions of a sliding window of duration shorter than the time period.

7. An apparatus as claimed in claim 6, wherein the selected criterion employed by the energy assessment means comprises maximization of the combined energy within the sliding window.

8. An apparatus as claimed in claim 7, wherein the path selection means includes means for selecting the earliest significant signal path by selecting the signal path which has a peak data value at the delay where the combined energy within the sliding window is maximized.

9. An apparatus as claimed in claim 8, wherein the data is sampled data derived at sample intervals and wherein the length of the window is 8 sample intervals.

10. An apparatus as claimed in claim 1, wherein the energy determination means includes means for determining the indication of combined energy as an indication of cumulative energy through the time period.

11. An apparatus as claimed in claim 10, wherein the indication of cumulative energy is a cumulative density function.

12. An apparatus as claimed in claim 10, wherein the selected criterion employed by the criterion assessment means comprises reaching a threshold value.

13. An apparatus as claimed in claim 12, wherein the path selection means includes means for selecting the earliest significant signal path dependent on the determined time by selecting the earliest signal path that has a peak data value at or after the determined time.

14. An apparatus as claimed in claim 1, comprising equalization means for employing the relative delay of the selected earliest significant signal path for further processing the received multipath signal.

15. An apparatus as claimed in claim 14, wherein the equalization means includes means for employing the relative delay of the selected earliest significant signal path, adjusted by a bias value dependent on a delay spread of the signal paths, for further processing the received multipath signal.

16. An apparatus as claimed in claim 15, comprising delay spread determination means for determining an indication of the delay spread of the signal paths as an indication of the time between the occurrence of two values of the cumulative energy.

17. An apparatus as claimed in claim 14, comprising means for employing the relative delay of the selected earliest significant signal path only if that time differs from a previously determined relative delay of a previously selected earliest significant signal path by more than a hysteresis value, otherwise employing a previously determined relative time of receipt.

18. An apparatus as claimed in claim 14, comprising means for employing the relative delay of the selected earliest significant signal path only if that time differs from a previously determined relative delay of a previously selected earliest significant signal path by less than a slew value, otherwise employing the previously determined relative delay adjusted by the slew value.

19. An apparatus as claimed in claim 1, comprising data generation means for employing the relative delay of the selected earliest significant signal path for generating data representative of the energy and relative delay of received signal paths.

20. An apparatus as claimed in claim 19, comprising data generation means for employing the relative delay of the selected earliest significant signal path, adjusted by a bias value dependent on the delay spread of the signal paths, for generating data representative of an amplitude and relative delay of received signal paths.

21. An apparatus of claim 1, wherein the multipath signal is a multipath Code Division Multiple Access (CDMA) signal.

22. An apparatus as claimed in claim 21, wherein the multipath CDMA signal comprises chips and the apparatus includes means for sampling the multipath CDMA signal at intervals of half a chip duration.

23. An apparatus as claimed in claim 1 wherein the apparatus is a mobile station.

24. A mobile communication system, comprising:
a transmitter for transmitting signals; and
a mobile station for receiving the transmitted signals as multipath signals, the mobile station including:
processing means for processing a received multipath signal having a plurality of signal paths to determine the earliest significant signal path, the processing means including:
data input means for providing, for each of a series of time periods, data representative of the energy and relative delay of the signal paths;
data filtering means, coupled to the data input means, for filtering the data for each time period to spread the data of each signal path;
signal path identification means, coupled to the data filtering means, for identifying from the filtered data a signal path which, after the spreading, is present at the same delay in a plurality of the time periods, and to identify any further such signal paths;
energy determination means, coupled to the signal path identification means, for determining an indication of combined energy of the filtered data of the identified signal paths within a time period;
energy assessment means, coupled to the energy determination means, for determining a time at which the indication satisfies a selected criterion; and
path selection means, coupled to the energy assessment means, for selecting the earliest significant signal path dependent on the determined time.

25. A system as claimed in claim 24, wherein the energy determination means include means for determining the indication of combined energy within successive positions of a sliding window of duration shorter than the time period.

26. A system as claimed in claim 25, wherein the path selection means includes means for selecting the earliest significant signal path by selecting the signal path which has a peak data value at the delay where the combined energy within the sliding window is maximized.

27. An apparatus, comprising:
a processor that processes a received multipath signal having a plurality of signal paths to determine the earliest significant signal path, the processor including:
a data input that provides, for each of a series of time periods, data representative of the energy and relative delay of the signal paths;
a data filter, coupled to the data input, wherein the data filter filters the data for each time period to spread the data of each signal path;
a signal path identifier, coupled to the data filter, wherein the signal path identifier identifies from the filtered data a signal path which, after the spreading, is present at the same delay in a plurality of the time periods, and which identifies any further such signal paths;
an energy determiner, coupled to the signal path identifier, wherein the energy determiner determines an indication of combined energy of the filtered data of the identified signal paths within a time period;
an energy assessor, coupled to the energy determiner, wherein the energy assessor determines a time at which the indication satisfies a selected criterion; and
a path selector, coupled to the energy assessor, wherein the path selector selects the earliest significant signal path dependent on the determined time.

28. A mobile communication system, comprising:
a transmitter for transmitting signals; and
a mobile station for receiving the transmitted signals as multipath signals, the mobile station including:
a processor that processes a received multipath signal having a plurality of signal paths to determine the earliest significant signal path, the processor including:
a data input that provides, for each of a series of time periods, data representative of the energy and relative delay of the signal paths;
a data filter, coupled to the data input, wherein the data filter filters the data for each time period to spread the data of each signal path;
a signal path identifier, coupled to the data filtering means, wherein the signal path identifier identifies from the filtered data a signal path which, after the spreading, is present at the same delay in a plurality of the time periods, and which identifies any further such signal paths;
an energy determiner, coupled to the signal path identifier, wherein the energy determiner determines an indication of combined energy of the filtered data of the identified signal paths within a time period;
an energy assessor, coupled to the energy determiner, wherein the energy assessor determines a time at which the indication satisfies a selected criterion; and
a path selector, coupled to the energy assessor, wherein the path selector selects the earliest significant signal path dependent on the determined time.

* * * * *